United States Patent [19]

Streubel et al.

[11] Patent Number: 5,189,790
[45] Date of Patent: Mar. 2, 1993

[54] METHOD OF FABRICATING A DOUBLE WALLED PIPE ELBOW

[75] Inventors: Wolfgang Streubel, Barntrup; Rainer Hansen, Paderborn-Elsen, both of Fed. Rep. of Germany

[73] Assignee: Benteler Aktiengesellschaft, Paderborn, Fed. Rep. of Germany

[21] Appl. No.: 714,253

[22] Filed: Jun. 12, 1991

[30] Foreign Application Priority Data

Jun. 22, 1990 [DE] Fed. Rep. of Germany ....... 4019899

[51] Int. Cl.⁵ .............................................. B21D 39/00
[52] U.S. Cl. .................................. 29/890.149; 29/424
[58] Field of Search ............. 89/890.149, 421.1, 455.1, 89/523, 424; 72/61

[56] References Cited

U.S. PATENT DOCUMENTS

| | | | |
|---|---|---|---|
| 1,956,604 | 5/1934 | Williams | 29/890.149 |
| 4,332,073 | 6/1982 | Yoshida et al. | 29/421.1 |
| 4,656,712 | 4/1987 | Harwood et al. | 29/455.1 |
| 4,694,864 | 9/1987 | Libin | 29/455.1 |
| 4,746,054 | 5/1988 | Moats et al. | 29/421.1 |
| 5,054,185 | 10/1991 | Usui et al. | 29/455.1 |

FOREIGN PATENT DOCUMENTS

| | | | |
|---|---|---|---|
| 0008160 | 1/1976 | Japan | 29/890.149 |
| 0633635 | 11/1978 | U.S.S.R. | 29/890.149 |

Primary Examiner—Irene Cuda
Attorney, Agent, or Firm—Toren, McGeady & Associates

[57] ABSTRACT

A double walled pipe elbow with an intermediate space between an inner pipe and an outer pipe is formed by joining the ends of a straight inner pipe and a straight outer pipe. The two pipes are bent into a desired shape and then placed in a shaping recess in a shaping tool. Seal plugs are placed at the opposite ends of the pipe elbow. In the sealed condition, a pressurized medium is supplied through at least one end seal plug into the inner pipe and between the inner and the outer pipe for expanding the outer pipe into surface contact with the shaping recess.

3 Claims, 2 Drawing Sheets

METHOD OF FABRICATING A DOUBLE WALLED PIPE ELBOW

BACKGROUND OF THE INVENTION

The present invention is directed to a method of and apparatus for fabricating a double walled pipe elbow by sliding an inner pipe into an outer pipe, connecting the ends of the pipes together and then bending the pipes into a desired configuration.

Such pipe elbows are used mainly as exhaust gas manifolds in cars with an intermediate space formed between the outer tube and inner tube being relatively small, for instance, approximately 3 millimeters.

To bend a double wall pipe elbow, where prior to the bending step the outer pipe is connected with the inner pipe in the region of their ends by welding, a bending mandril or arbor is inserted into the inner pipe, to prevent crimping or crushing during the bending step and to maintain the original cross-section.

Due to the bending forces developed during the bending step, the outer pipe is deformed so that at least a part of it comes in contact with the inner pipe, whereby the desired effect of the double wall for heating and sound insulation improvement, as compared to a single walled pipe elbow, is not achieved.

It is known from DE-OS 37 12 193 to fill the intermediate space between the inner and outer pipes with a powder for preventing unwanted deformation of the outer pipe during the bending step.

Such a process is both cumbersome and costly, and, because the double walled pipe elbow is fabricated as a mass production article, is considered as particularly disadvantageous.

SUMMARY OF THE INVENTION

Therefore, it is the primary object of the present invention to provide a method of bending a double-walled pipe elbow which is fully functional and can be economically fabricated, especially in mass production.

In accordance with the present invention, the inner and outer pipes, after being bent, are placed in a shaping tool having a hollow interior space corresponding to the final shape of the outside surface of the outer pipe. After sealing the ends of the outer pipe in a pressure tight manner, a pressurized medium is introduced between the inner and outer pipe and into the interior of the inner pipe, so that the outer pipe is expanded into full surface contact with the interior space with the shaping tool and thereby forming an intermediate hollow or open space between the two pipes. With the pressurized medium directed into the space between the two pipes the outer pipe is expanded outwardly and forced against the surface of the shaping space in the shaping tool. As a result, the desired configuration of the outer tube is produced.

Since the pressure of the pressurizing medium within the intermediate space between the inner and outer pipes and in the interior of the inner pipe is of the same magnitude, the shape of the inner tube is not affected.

Depending on the shape of the space within the shaping tool, the spacing between the inner and outer pipes can be changed as compared to the conditions prior to the bending step, whereby functional requirements can be taken into account.

Apparatus for carrying out the method includes the shaping tool formed of two half shells which can be connected together. A seal plug is placed at each end of the pipe elbow and the plugs seal the outer pipe in a pressure tight manner. The pressurized medium can be supplied to the pipe elbow through at least one seal plug.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
FIGS. 1 to 4 are axially extending sectional views of the pipes forming the pipe elbow in the different steps of the method embodying the present invention.

The individual parts forming the double walled pipe elbow are shown in FIG. 1 before assembly.

Figure 2:
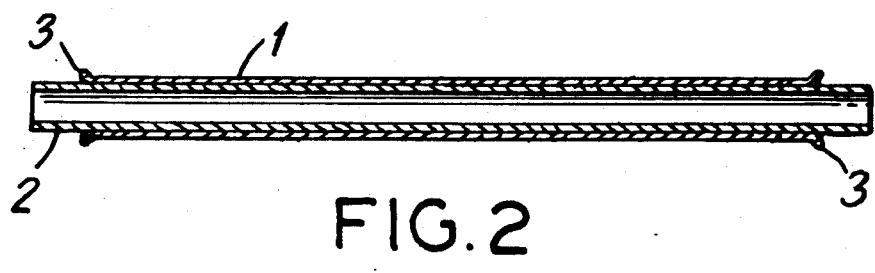

As shown in FIG. 2, an inner pipe 2 is slid into an outer pipe 1 with the pipes in close sliding contact.

In the embodiment of the pipe elbow displayed in FIGS. 1 to 4, inner pipe 2 is longer in the axial direction than the outer pipe 1, so that the inner pipe projects outwardly from both ends of the outer pipe 1.

The ends of the outer tube 1 are expanded conically forming a circumferential collar 3.

As can be seen in FIG. 2, with the inner pipe 2 inserted into the outer pipe 1, the ends of the outer pipe 1 are connected to the inner pipe 2, such as by point welding.

Figure 3:
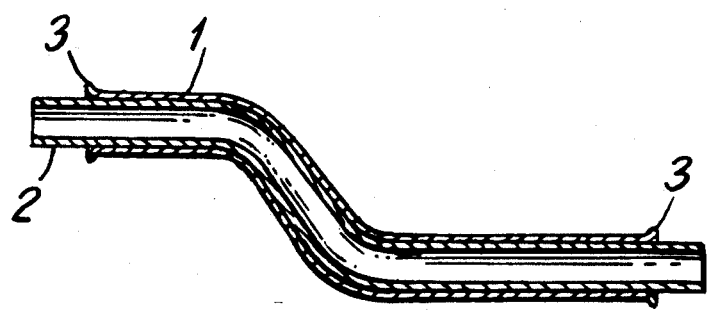

In FIG. 3, the pipe elbow is displayed after the assembled outer pipe 1 and inner pipe 2 have been bent.

As can be seen in FIG. 3, the inside surface of the outer pipe 1 rests at least partially against the outside surface of the inner pipe 2, whereby there is no intermediate space between the two pipes.

Figure 4:
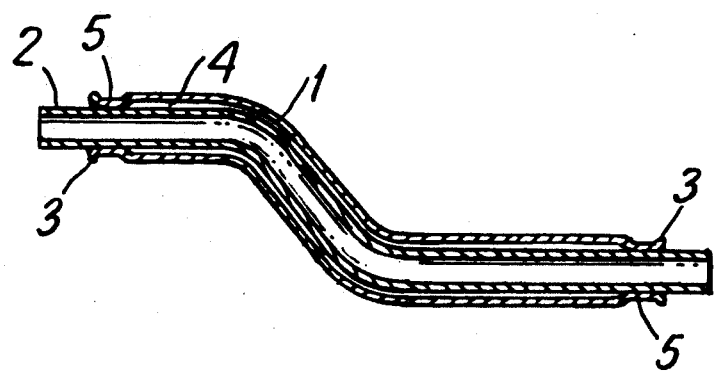

A double walled pipe elbow formed in accordance with the present invention is shown in FIG. 4 with the inside surface of the outer pipe 1 enclosing and spaced at a uniform spacing from the outside surface of the inner pipe 2, except for constriction resulting in contacting location between the outer and inner pipes, whereby a hollow or open intermediate space is formed between the two pipes.

An apparatus for carrying out the method is illustrated in FIGS. 5-9, comprising a shaping tool formed of a first half shell 6 and a second half shell 7 with a tapered plug 8 for forming a seal.

In combination, the first shell 6 and the second shell 7 each have a recess which together form a shaping recess when the two shells are connected together. The configuration of the shaping recess corresponds to the final shape of the outside surface of the outer pipe 1 of the pipe elbow.

In position to deform the outer pipe 1, the tapered plug 8 seals the end of the outer pipe 1. Accordingly, the tapered seal plug 8 in the embodiment shown in FIGS. 5 and 7 has a conically shaped end facing the corresponding end of the outer pipe 1 and it presses the conically shaped collar 3 against the similarly shaped opening in the end of the shaping tool through which the pipes 1 and 2 extend.

At least one through passage 9 is provided between the outer pipe 1 and the inner pipe 2 in the region of constrictions 5 so that a pressurized medium, preferably a liquid medium, such as an oil emulsion, can be introduced between the inside surface of the outer pipe 1 and the outside surface of the inner pipe 2 for forming the open intermediate space 4 between them.

Figure 5:
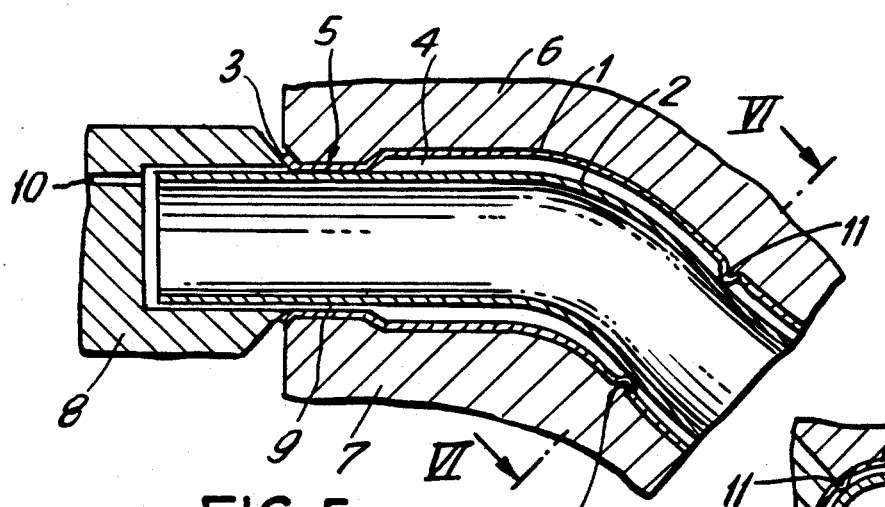
FIG. 5 is a partial axially extending sectional view through an apparatus for carrying out the method of the present invention.

While the pipe elbow is tightly sealed at one end by the tapered seal plug 8, the plug 8 at the other end has a flow through aperture 10, note FIG. 5, whereby the pressurized medium can flow into the intermediate space 4 as well as into the interior of the inner pipe 2.

Figure 7:
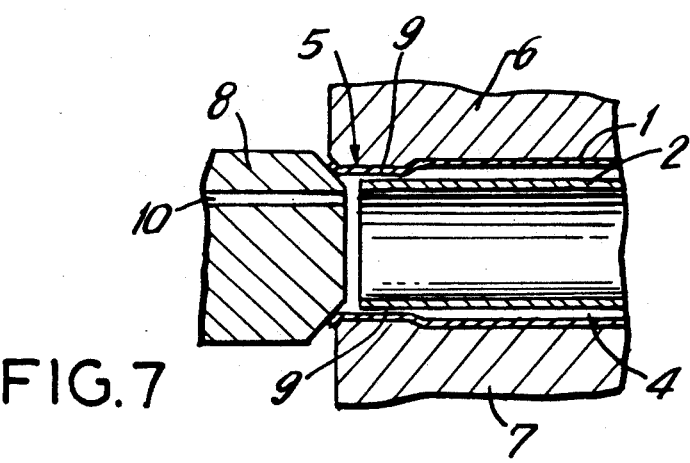
FIG. 7 is another embodiment of the apparatus illustrated in partial axially extending section.

While the embodiment displayed in FIG. 5 fabricates the pipe elbow with the inner tube 2 projecting outwardly from the ends of the outer pipe 1, with the projecting portion partially guided in the tapered seal plug 8, the embodiment of the apparatus set forth in FIG. 7 is employed where the inner pipe 2 is shorter than the outer pipe 1.

Figure 6:
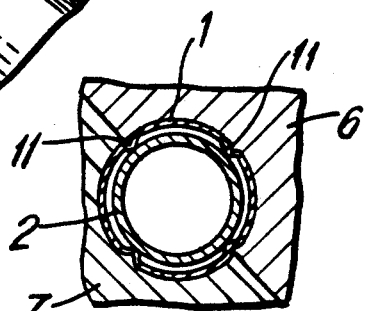
FIG. 6 is a transverse cross-sectional of the apparatus taken along the line VI—VI in FIG. 5.
Figure 8:
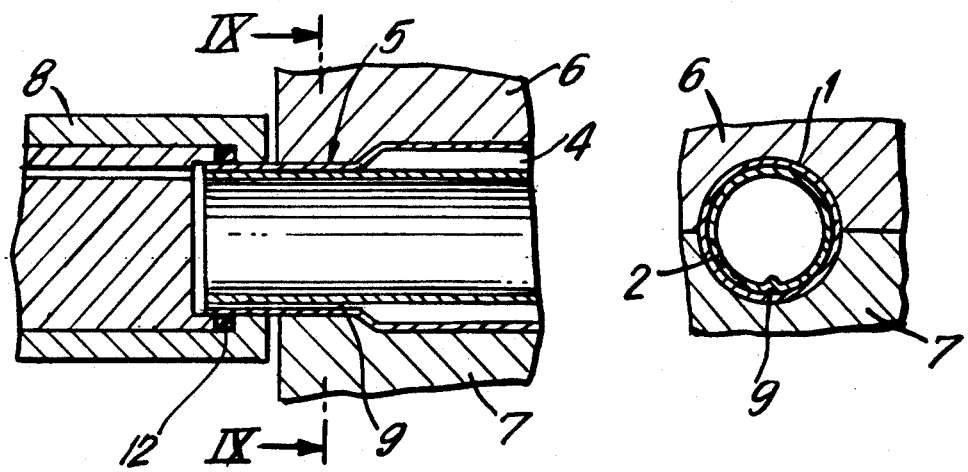
FIG. 8 is still another embodiment of the apparatus also in partial axially extending section.
Figure 9:
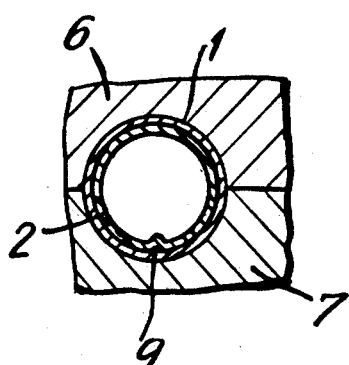
FIG. 9 is a cross-section through the apparatus taken along the line IX—IX in FIG. 8.

In FIG. 8 another pipe elbow embodiment is shown where the outer pipe 1 and the inner pipe 2 are of the same length. In this embodiment, the outer pipe 1 is encircled by a seal 12 within the plug 8 so that the pressurized medium can not escape. For positioning the pipes, particularly in longer pipe elbows, the outer pipe 1 is provided with dimple-like inwardly directed projections as illustrated in FIGS. 5 and 6, whereby the projections 11 extend inwardly toward and into contact with the outside surface of the inner pipe 2.

The method of the present invention is carried out in the following manner. First the inner pipe 2 is pushed or slid into the outer pipe 1 and the pipes 1 and 2 are connected to one another at the ends of the outer pipe, note FIG. 2, so that a double walled pipe is formed. The double walled pipe is then bent in a known bending device, and, during the bending step, a bending mandril is guided into the inner pipe for maintaining its shape. Next, the bent pipe elbow is placed into the second half shell 7 in the open position of the shaping tool with the first half shell 6 then placed on the second shell 7 for completing the shaping recess within the shaping tool which corresponds to the final configuration of the outer pipe 1 of the pipe elbow.

The shaping tool (6, 7) is configured to fit closely around the constrictions 5 at the ends of the outer pipe 1.

A tapered seal plug 8 is arranged at each of the opposite ends of the pipe elbow and is pressed against the ends of the outer pipe so that the ends are sealed in a pressure tight manner. A pressurized medium is then directed into the pipe elbow through a flow passageway 10 in the tapered plug seal plug 8. The pressurized medium flows through the passage 9 into the intermediate space 4, that is, the space between the outside surface of the inner pipe 2 and the inside surface of the outer pipe 1 and at the same time the pressurized medium flows into the inside of the inner pipe 2. As a result, the pressurized medium deforms the outer pipe 1 against the surface of the shaping recess within the shaping tool (6, 7), whereby the desired final configuration of the outer pipe 1 is produced along with the intermediate space 4.

Since the same pressure conditions are present within the inner pipe 2 and the intermediate space 4, the inner pipe retains its original shape.

While specific embodiments of the invention have been shown and described in detail to illustrate the application of the inventive principles, it will be understood that the invention may be embodied otherwise without departing from such principles.

We claim:

1. Method of fabricating a double walled pipe elbow comprising sliding an inner pipe having an inside surface and an outside surface and opposite ends into an outer pipe having an inside surface and outside surface and opposite ends, connecting the inner and outer pipes together at least at the ends of one of the pipes, inserting a bending mandril into the inner pipe and bending the inner and outer pipes into a bent configuration, wherein the improvement comprises placing the inner and outer pipes into a hollow interior space of a shaping tool with the interior space corresponding to the final shape of the outside surface of the outer pipe, sealing the ends of the outer pipe in a pressure tight manner, introducing a pressure medium between the outside surface of the inner pipe and the inside surface of the outer pipe and also into the inner pipe and expanding the outer pipe so that the outside surface thereof is in full surface contact with the hollow interior space of the shaping tool and thereby forming an open intermediate space between the outside surface of the inner pipe and the inside surface of the outer pipe.

2. Method, as set forth in claim 1, comprising the further step of injecting the pressurized medium through a passageway 9 through the connection between the outer and inner pipes between the outside surface of the inner pipe and the inside surface of the outer pipe.

3. Method, as set forth in claim 1, comprising the further step of forming inwardly directed projections in the outer pipe extending through the intermediate space into contact with the outside surface of the inner pipe.

* * * * *